Figure 4A:
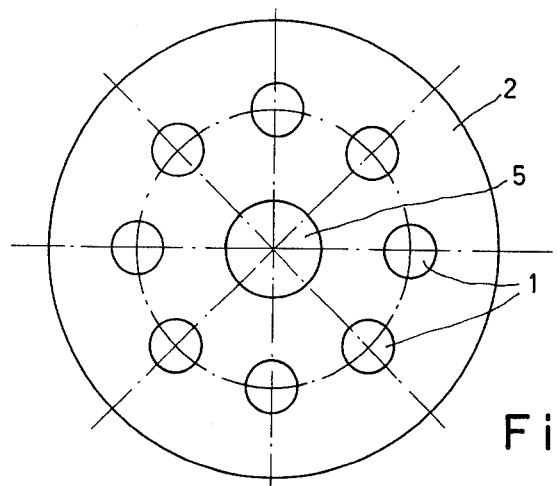

United States Patent [19]

Roeder et al.

[11] 4,022,603

[45] May 10, 1977

[54] DEVICE FOR MANUFACTURING HOLLOW PROFILED BODIES BY EXTRUSION

[75] Inventors: Erwin Roeder; Edmund Steinbeck, both of Aachen, Germany

[73] Assignee: U.S. Philips Corporation, New York, N.Y.

[22] Filed: Oct. 7, 1975

[21] Appl. No.: 620,303

[30] Foreign Application Priority Data

Oct. 10, 1974 Germany .......................... 2448256

[52] U.S. Cl. ...................................... 65/145; 65/1; 65/121; 65/187; 72/468; 425/378 S; 425/381
[51] Int. Cl.² ...................................... C03B 37/02
[58] Field of Search ............ 264/171; 65/1, 2, 3 R, 65/3 A, 3 C, 121, 187, 191, 333, 145; 425/378 R, 378 S, 381; 72/264, 258, 468

[56] References Cited

UNITED STATES PATENTS

| 2,736,921 | 3/1956 | Mulbarger et al. ................ 264/171 |
| 3,559,239 | 2/1971 | Work et al. .................... 264/171 X |
| 3,585,684 | 6/1971 | McIntosh et al. .......... 425/378 S X |
| 3,725,192 | 4/1973 | Ando et al. .................... 264/171 X |

FOREIGN PATENTS OR APPLICATIONS 355,599  8/1931  United Kingdom ................ 65/121

Primary Examiner—Robert L. Lindsay, Jr.
Attorney, Agent, or Firm—Frank R. Trifari; David R. Treacy

[57] ABSTRACT

An extrusion die for forming hollow bodies has a flow-adjusting ring which also defines the outer periphery of the flow gap for the outer portion of the body.

1 Claim, 12 Drawing Figures

DEVICE FOR MANUFACTURING HOLLOW PROFILED BODIES BY EXTRUSION

The invention relates to a method of manufacturing hollow profiled bodies by extrusion, the mass to be processed consisting of a material which can be plasticized and drawn by heating, and furthermore relates to a device for performing this method.

Extrusion methods for the manufacture of rods, tubes or arbitrary profiles are known from the metal working industry, the synthetic materials processing industry, as well as the ceramics industry. In view of the development of new kinds of glasses which cannot be readily processed using the methods known in the glass industry such as casting, blowing, drawing, pressing and rolling, extrusion has also found application in glass technology. An example in this respect is the manufacture of semi-finished products of glass which are used for optical data transmission.

Semi-finished products, such as tubes or rods are drawn in various successive drawing steps to form fibres having a very small diameter in the order of a few $\mu$m. For a special waveguide type (so-called single material fibre) glass fibres are required having an internal profile. The tubular glass body has an internal structure, like a cell structure, but consists of a homogeneous glass matrix. In accordance with the application, very severe requirements must be imposed as regards the quality of such a type of structured hollow bodies. It must be ensured that the geometry of the cell structure in the glass tubes, being drawn to the desired very small diameter during successive drawing steps, is not modified during any of the processing steps, i.e. the desired relationships between outer tube and cell structure should remain unmodified as much as possible. However, it should also be ensured that no mechanical stresses occur due to different thickness ratios of the tube wall and the cell structure forming the profile.

It is known (The Bell System Technical Journal, 52 (1973), pages 165 – 269) to manufacture fibres having an internal profile as follows: first of all, a glass rod having a diameter of approximately 1 mm is secured (in a manner not described) on a glass plate having a thickness of approximately 0.2 mm; this combination is inserted into a glass tube having an internal diameter of 6.5 mm and an external diameter of 10 mm. This assembly, consisting of three components of the same kind of glass, is subsequently drawn to form a thin fibre having a diameter of approximately 100 $\mu$m. This is an extremely complex, hardly reproducible process which is at best suitable for laboratory purposes. For the industrial manufacture of glass fibres of the said kind, it is virtually impossible to follow this approach.

The invention has for its object to provide a method and a device whereby hollow bodies having an internal profile, possibly in combination with an external profile, can be manufactured in one operation with a reproducible quality, particular as regards the dimensional relationships. According to the invention, this object is achieved in that during the extrusion the mass to be processed is divided into separately dosable, individual portions by the extrusion tool, the said portions being subsequently combined such that an internal profile or an internal profile and an external profile are simultaneously imparted to the ultimate extruded product.

The advantages achieved according to the invention notably consist in that even complex internal profiles, and possibly external profiles can be manufactured in a single operation without mechanical stresses occurring, the said method and device also being suitable for bulk manufacture, possibly in a continuous process. For the manufacture of semi-finished products consisting of special kinds of glass for optical data transmission, a further advantage exists in that kinds of glass which are difficult to process on account of their chemical composition can even be processed into profiled semifinished products of very high quality. The viscosity is very important during the processing of a glass. Between the molten state and the state at ambient temperature, there is a difference in viscosity of more than $10^{17}$ poise. Since the viscosity changes substantially as the temperature changes, the processing range extends over only a small temperature interval. For types of glass for which only a very small temperature variation may occur during the shaping, it is particularly difficult to obtain internal profiles of constant quality and dimensional accuracy. Because substantially large temperature differences are avoided during the extrusion because of the highly constant temperature of the feed vessel and the die, profiles can even be suitably made from the so-called "short" types of glass, i.e. types of glass having a small processing temperature range, because the processing temperature and hence the viscosity required for shaping the profiles, which must under given circumstances be higher than, for example, during the manufacture of a rod, can be stabilized very well.

The invention offers a further advantage as regards the processing of types of glass exhibiting a strong tendency to crystallize. Because the glass to be processed is enclosed substantially completely by the feed vessel and the dies, deformation forces can be exerted on the glass which are higher than those feasible when a force is exerted in only one direction, for example, during drawing. This means that the shaping during extrusion can be effected at a higher viscosity, i.e. at a temperature which is lower, than in the case of the known methods for manufacturing glass tubes having an internal profile. This benefits the accuracy of the shape of the internal profile.

A further essential advantage offered by the invention consists in that the extruded product discharged from the die duct in the hot condition can be directly drawn to longer lengths without a further cooling process being required, i.e. the section of the extruded product can be reliably reduced without disturbing the profile.

The drawing shows preferred embodiments according to the invention which will be described in detail hereinafter.

Figure 1A:
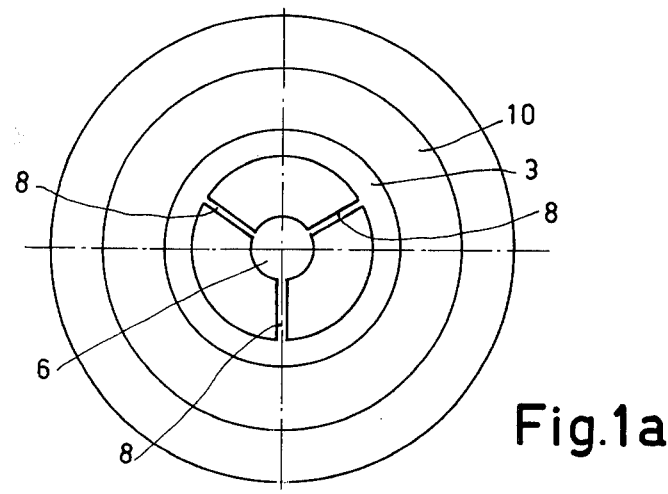
Figure 4B:
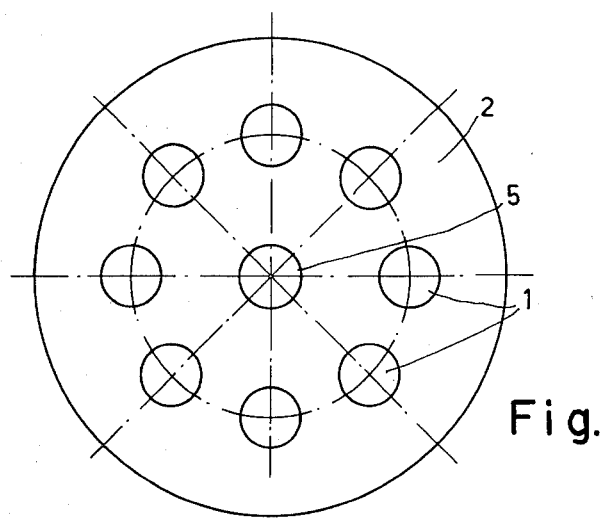
Figure 3B:
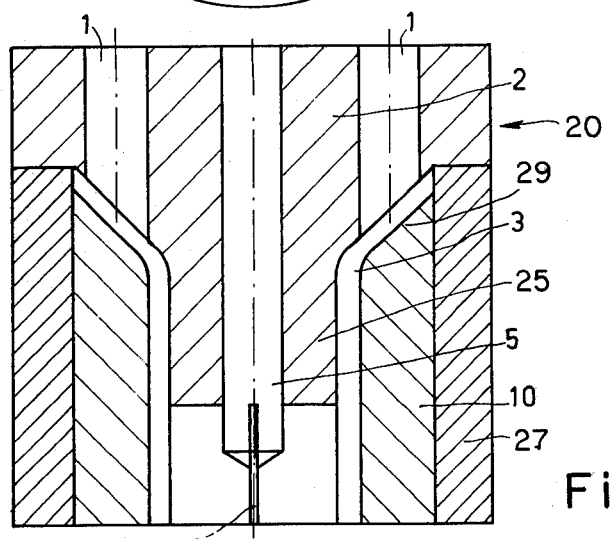
Figure 1B:
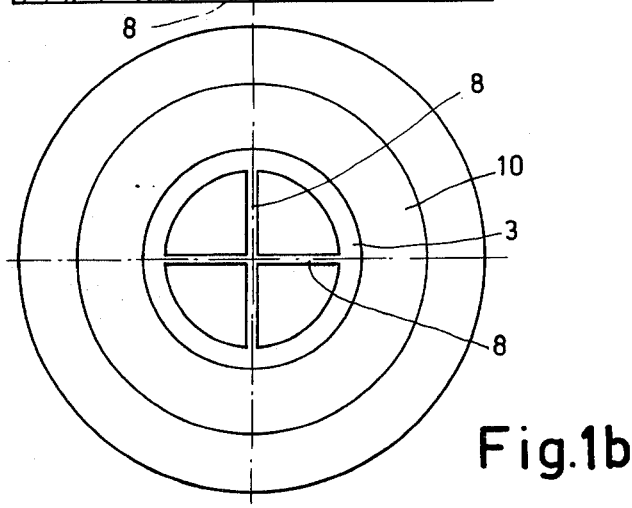
Figure 4C:
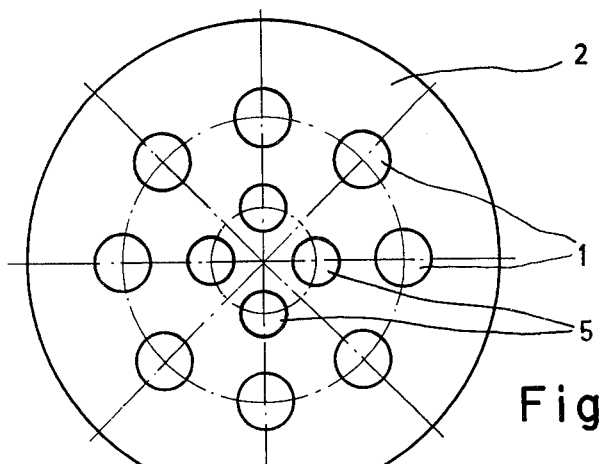
Figure 3C:
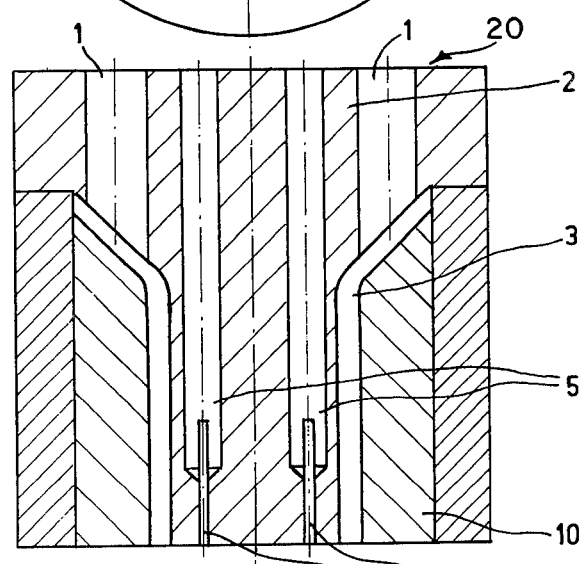
Figure 1C:
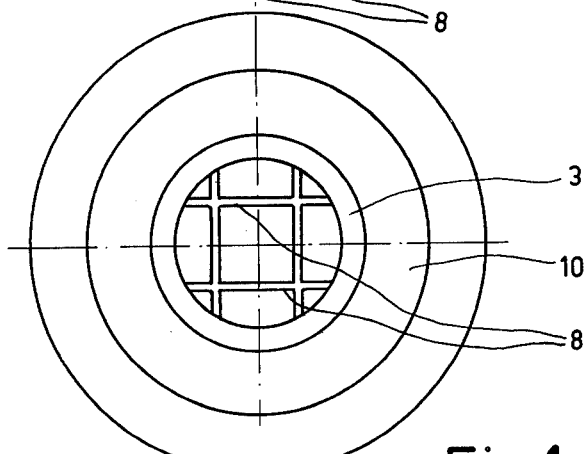
Figure 2A:
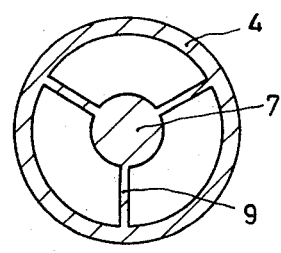
Figure 2B:
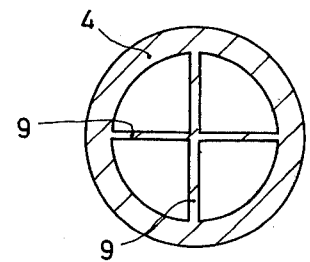
Figure 2C:
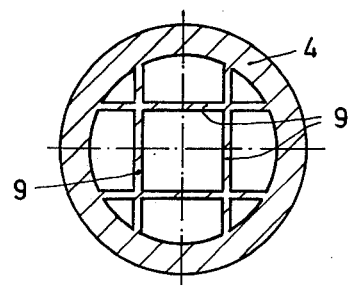

FIGS. 1a, 1b, and 1c are bottom views of extrusion dies according to the invention, FIGS. 2a, 2b, and 2c are cross-sectional views of the profiled hollow bodies manufactured using the devices shown in the FIGS. 1a, 1b and 1c, FIGS. 3a, 3b and 3c are side views in section of the respective embodiments of FIGS. 1a, 1b, and 1c, and FIGS. 4a, 4b and 4c are top views of the respective embodiments of FIGS. 1a, 1b and 1c.

The tube comprising an internal profile, shown in cross-sectional view in FIG. 2a, was manufactured using the die shown in FIG. 1a; the profile shown in FIG. 2b was manufactured using the die shown in FIG. 1b, and that shown in FIG. 2c was manufactured using the die shown in FIG. 1c.

After heating to the extrusion temperature, and after application of an extrusion pressure, the material to be extruded, for example, an inorganic glass, partly flows through the passages or ducts 1 of the base part 2 of a mandril generally designated 20 into an annular gap 3, thus forming an outer portion or tube 4 of the hollow body. A further portion of the mass to be processed flows through at least one duct or passage 5 which extends longitudinally through a part 25 which projects from the base part 2.

Figure 3A:
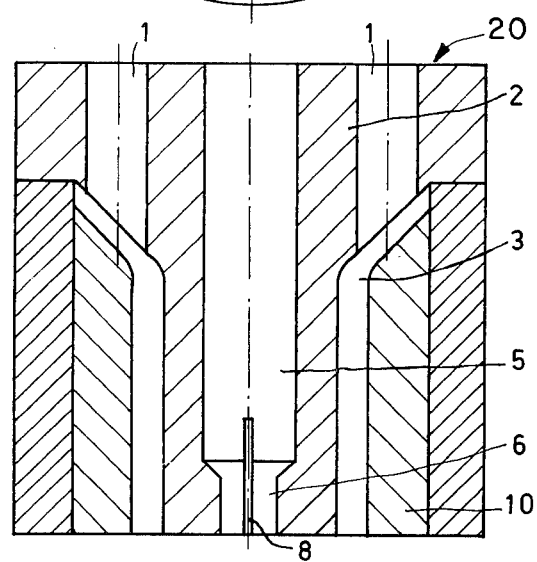

In accordance with FIGS. 1a, 3a and 4a, the mass to be processed which arrives from the duct 5 flows through a constricted opening 6, so that a core 7 is formed, as well as through slots 8 whereby partitions 9 are formed. The mass flowing through the slots 8 arrives in the tube 4. The profile shown in FIG. 2a is thus obtained.

Similarly, the profiles shown in the FIGS. 2b and 2c are obtained, however without the core 7, utilizing dies as shown in the FIGS. 1b and 1c. In order to prevent deformation of the discharged profile and stresses in the extruded product, the extrusion masses flowing through the ducts 1 and 5 should be attuned to each other. This can be effected by sliding a portion 10, which is preferably formed as an adjusting ring, upwards or downwards within a support 27. As a result, the discharge rate of the tube 4 is decreased and increased, respectively, by varying the clearance between flow-constricting end 29 of the ring 10 and the passage ducts.

The extruded product which is shown in a sectional view in the FIGS. 2a, 2b and 2c has an outer diameter of approximately 20 mm, it being difficult to reduce this dimension substantially for manufacturing-technical reasons in the construction of the dies. In order to enable glass fibres having a diameter in the order of magnitude of 100 μm or less to be manufactured, the extruded product discharged from the die duct in the hot condition is immediately subjected to a drawing process, utilizing the heating in the extrusion tool, so as to reduce the section to the desired value. When required, the drawing temperature can possibly be slightly higher than the extrusion temperature.

For this embodiment the manufacture of fibres made of a special glass was described. Needless to say that other materials can also be used in the same manner for manufacturing profiled semi-finished products. Metal or synthetic material can also be used for this purpose.

Similarly, the method according to the invention and the device for performing the method can be used for the manufacture of all bodies having an internal profile which require larger dimensions than the described glass fibres. Some examples in this respect are heat exchangers or conduction systems for the separate transport of gaseous or liquid mediums.

What is claimed is:
1. An extrusion die for forming hollow elongated bodies, comprising a mandril having a base part and a longitudinally extending part; an adjusting ring; and means for supporting the ring about said extending part for longitudinally slidable movement with respect to the mandril, said extending part and said ring defining a longitudinally extending gap therebetween; said mandril comprising at least one first passage disposed through said base part and communicating with said gap for conducting material to be extruded to form an outer portion of an elongated body, said ring having a flow constricting end arranged such that upon longitudinal movement of said ring toward said base part said end restricts flow of material from said first passage to said gap; said mandril additionally comprising at least one second passage disposed through said extending part for conducting material to be extruded to form a core portion of said elongated body.

* * * * *